US008194254B2

(12) United States Patent
Lutnesky et al.

(10) Patent No.: US 8,194,254 B2
(45) **Date of Patent: *Jun. 5, 2012**

(54) PRINT DEVICE PRECONDITIONING

(75) Inventors: Gary G. Lutnesky, Corvallis, OR (US); Sang O. Bradley, Corvallis, OR (US); Raymon Dale Burrows, Albany, OR (US); Dennis T. So, Corvallis, OR (US); Kevin E. Swier, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1526 days.

This patent is subject to a terminal disclaimer.

(21) Appl. No.: 11/669,149

(22) Filed: Jan. 30, 2007

(65) Prior Publication Data

US 2008/0180719 A1 Jul. 31, 2008

(51) Int. Cl.
*G06F 3/12* (2006.01)

(52) U.S. Cl. ............... 358/1.1; 347/109; 347/2; 347/14; 347/186; 235/472.01; 235/432; 235/472.02

(58) Field of Classification Search ................... 358/1.1; 347/109, 2, 14, 186; 235/472.01, 432, 472.02, 235/472.2
See application file for complete search history.

(56) References Cited

U.S. PATENT DOCUMENTS 4,180,204 A 12/1979 Koenig et al.
4,377,741 A * 3/1983 Brekka et al. ............ 235/472.01
4,947,262 A 8/1990 Yajima et al.
5,012,349 A 4/1991 de Fay
5,109,234 A * 4/1992 Otis et al. ........................ 347/14
5,191,360 A * 3/1993 Pohlig ............................ 347/17
5,274,461 A * 12/1993 Mitsuhashi ................... 358/296
5,340,971 A 8/1994 Rockstein et al.
5,369,262 A 11/1994 Dvorkis et al.
5,532,467 A 7/1996 Roustaei
5,668,364 A * 9/1997 Swartz et al. ............ 235/472.02
5,825,010 A 10/1998 Charych et al.
6,015,211 A * 1/2000 Kinoshita et al. ............. 347/109
6,206,288 B1 3/2001 May et al.
6,229,565 B1 5/2001 Bobry
6,347,743 B2 2/2002 Wilz, Sr. et al.
6,415,982 B2 7/2002 Bridgelall et al.
6,505,776 B1 1/2003 Wilz, Sr. et al.
6,565,005 B1 5/2003 Wilz et al.
6,567,126 B1 5/2003 Slatter et al.
6,618,078 B1 9/2003 Budrys
6,688,526 B2 2/2004 Metlitsky et al.
6,736,315 B2 * 5/2004 Swartz .......................... 235/383
6,773,177 B2 8/2004 Denoue et al.
6,820,809 B2 11/2004 Juntunen
6,910,633 B2 6/2005 Swartz et al.
6,952,880 B2 10/2005 Saksa
6,991,332 B1 1/2006 Fan et al.
7,416,127 B2 * 8/2008 Page ........................ 235/462.45
7,654,665 B2 * 2/2010 Gray et al. .................... 347/109
2002/0024542 A1 2/2002 Ericson et al.
2002/0063907 A1 * 5/2002 Harrington .................. 358/504

(Continued)

OTHER PUBLICATIONS

Migatron Corp. , Ultrasonic Detections and Control Applications, http://www.migatron.com/apps.htm, Nov. 10, 2006, Woodstock, IL.

*Primary Examiner* — Benny Q Tieu
*Assistant Examiner* — Paul F Payer

(57) ABSTRACT

Various embodiments relating to preconditioning of a print device are disclosed.

24 Claims, 3 Drawing Sheets

U.S. PATENT DOCUMENTS

| | | | | |
|---|---|---|---|---|
| 2002/0171693 | A1 | 11/2002 | Murray | |
| 2003/0037448 | A1 | 2/2003 | Saksa | |
| 2003/0098897 | A1 | 5/2003 | Hoshino et al. | |
| 2004/0109034 | A1 | 6/2004 | Brouhon | |
| 2005/0167507 | A1 | 8/2005 | Swartz et al. | |
| 2007/0195151 | A1 * | 8/2007 | Anderson et al. | 347/109 |

* cited by examiner

PRINT DEVICE PRECONDITIONING

CROSS-REFERENCE TO RELATED PATENT APPLICATIONS

The present application is related to co-pending U.S. patent application Ser. No. 11/830,765 filed on Jul. 30, 2007 by Studer et al. and entitled PRINTHEAD PRECONDITIONING TRIGGER, the full disclosure of which is hereby incorporated by reference.

BACKGROUND

Many activities may be performed to ready a print device for printing. Such activities consume valuable time and may delay printing.

DETAILED DESCRIPTION OF THE EXAMPLE EMBODIMENTS

Figure 1:
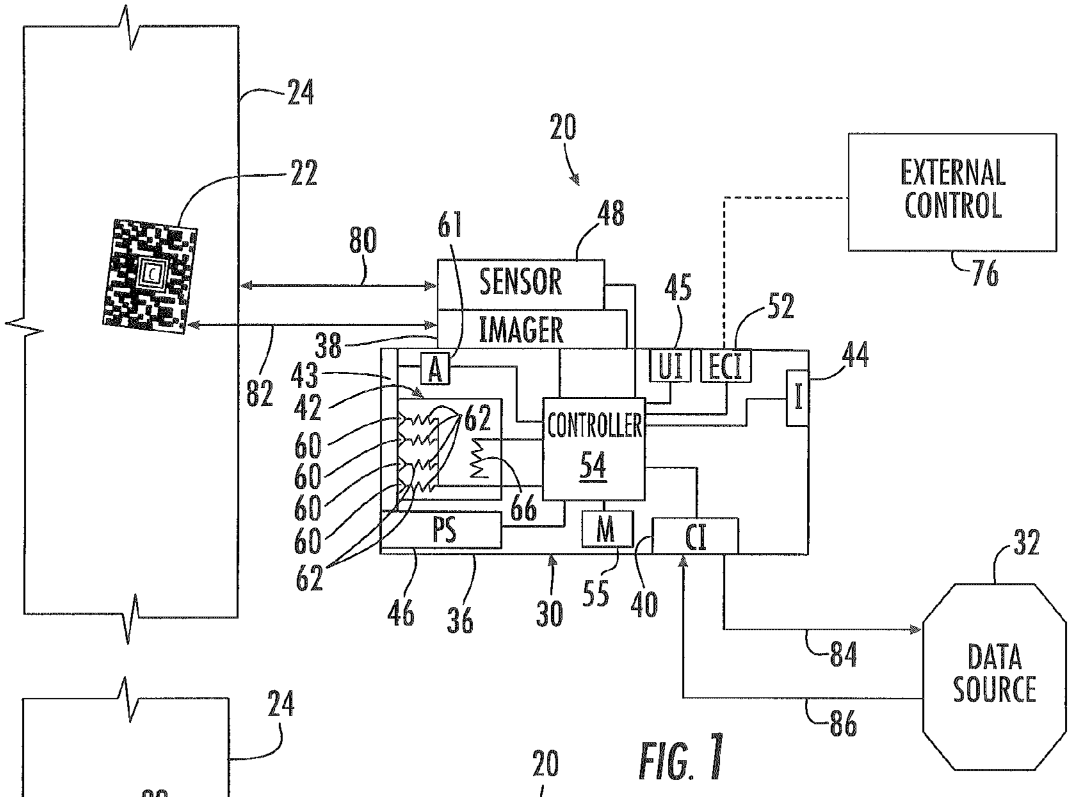
FIG. 1 is a schematic illustration of a printing system and a surface containing an image to be captured according to an example embodiment.
Figure 2:
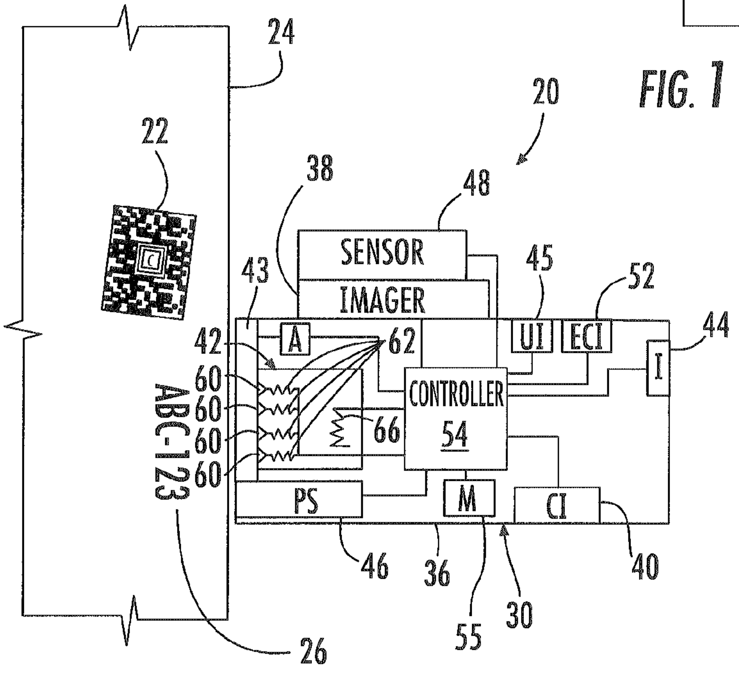
FIG. 2 is a schematic illustration of the printing system of FIG. 1 with a capture and print unit printing an image upon the surface according to an example embodiment.

FIGS. 1 and 2 schematically illustrate one example of a printing system 20. Printing system 20 is configured to print an image 26 upon surface 24. Printing system 20 initiates preconditioning of a print device used to print image 26 to prepare the pen device for printing prior to receipt of the print command and in response to a sensed proximity to a surface prior to receipt of a print command. For purposes of this disclosure, a preconditioning activity is one which prepares the printing device for printing. Examples of preconditioning activities include, but are not limited to, initiating a printing device encoder, initiating printhead warming, initiating media or safety sensors and repositioning of one or more covers or shutters which may normally extend across the printing device when system 20 is not printing. Because one or more print device preconditioning activities are initiated at a time prior to receipt of a print command or receipt of print instructions, image 26 may be printed at an earlier time once printing instructions are received. As a result, printing efficiency is enhanced.

As shown by FIG. 1, printing system 20 includes capture and print unit 30 and data source 32. Capture and print unit 30 comprises a mechanism configured to capture image 22 and transmit the captured image 22 to data source 32. Capture and print unit 30 further receives printing instructions from data source 32 and prints image 26 upon surface 24 or another surface. Capture and print unit 30 is configured to initiate the preconditioning of its print device to prepare the print device for printing and the capturing of image 22 in response to either a sensed proximity to a surface 24 or in response to an externally originating preconditioning signal.

Data source 32 comprises a device external to capture and print unit 30 and configured to receive data from unit 30, to analyze the captured image or data and to transmit printing instructions to capture and print unit 30 that are based at least in part upon the captured image 22 and the information that it represents. In one embodiment, data source 32 may comprise a communications access point, a data server or other data processing and communication device. In yet other embodiments, data source 32 may be omitted, wherein data source 32 is incorporated as part of capture and print unit 30.

In the particular example illustrated, capture and print unit 30 includes body 36, imager 38, communications interface 40, print device 42, cover 43, ready indicator 44, user interface 45, print sensor 46, sensor 48, external preconditioning control signal interface 52, and controller 54. Body 36 comprises a structure configured to support the remaining components of capture and print unit 30. Body 36 is further configured to at least partially encloses or house such components. In one embodiment, body 36 is configured such that capture and print unit 30 is a hand held unit. In one embodiment, body 36 is a elongate bar-shaped handle, cylinder or similar structure configured to be grasped by a person's hand with the person's fingers wrapped about body 36. In another embodiment, body 36 has a gun handle configuration, facilitating manipulation of capture and print unit 30. In yet other embodiments, body 36 is configured to be mounted or otherwise secured to a frame or other supporting structure.

Imager 38 comprises a component of capture and print unit 30 configured to sense, scan or capture an image upon a surface. In one embodiment, imager 38 comprises a scanner module comprising a two dimensional (2D) charge coupled device (CCD) and one or more illumination sources such as targeted light emitting diodes, facilitating omni-directional scanning a in lowlight conditions. In other embodiments, imager 38 may comprise other devices configured to sense or capture the visible image such as other forms of a camera and the like. In yet other embodiments, imager 38 may utilize ultraviolet or infrared light to scanner sense an image on surface 24. In one embodiment, imager 38 may be configured to read a code such as a Maxi code, barcode, Universal Product Code (UPC) and the like.

Communication interface 40 comprises a component of capture and print unit 30 configured to communicate with external electronic devices such as data source 32. Communication interface 40 is configured to transmit data as well as to receive data. In one embodiment, communication interface 40 is configured to communicate wirelessly with external electronic devices. For example, in one embodiment, communication interface 40 may communicate with radio waves such as with a wireless IEEE 802.11g module. In other embodiments, communication interface 40 may communicate with ultraviolet or infrared light. In still other embodiments, communication interface 40 may be a wired connection where communication occurs through electrical or optical cables. For example, in one embodiment, communication interface 40 may comprise a Universal Serial Bus port. In other embodiments where data source 32 is incorporated into capture and print unit 30, communication interface 40 may be omitted.

Print device 42 comprises a device configured to print or form an image upon a surface, such as surface 24. Print device 42 is configured such that printing performance of print device 42 is enabled or enhanced when print device 42 is warmed, such as to a temperature greater than room temperature. According to one embodiment, print device 42 is configured to deposit a fluid printing material or solution. When heated to an elevated temperature, the fluid printing material experiences enhanced fluid mechanics, whereby the fluid printing material more easily flows and fills ejection chambers and is more responsive to high frequency pulsing.

According to one embodiment, print device 42 comprises a thermal resistive drop-on-demand ink jet print head having nozzles 60 and firing resisters 62. Electrical energy is applied to firing resisters 62 which heat up to a temperature sufficient to vaporize fluid within the corresponding fluid chambers (not shown), forcing drops of the fluid through corresponding nozzles 60. In addition to ejecting or firing fluid droplets, firing resisters 62 may also be used to warm or pre-warm the print head of print device 42. In particular, pulses of electrical energy are provided to firing resisters 62. Although the pulses of electrical energy are insufficient to heat such resisters 62 to a point so as to vaporize the fluid and eject the fluid droplets through nozzles 60, the pulses are sufficient to heat or firing resisters 62 to temperatures sufficient to warm or heat the print head of print device 42.

As further shown by FIG. 1, print device 42 further includes a block resister 66. Block resister 66 comprises a generally larger resister as compared to the individual firing resisters 62. Upon receiving electrical energy, block resister 66 heats up and discharges thermal energy has to heat a large portion or end entirety of the one or more print heads of print device 42. According to one embodiment, firing resisters 62 as well as block resister 66 comprise temperature sensitive resistors (such as thermal sense resistors (TSR)) which serve dual purposes of providing resistive heat and facilitating temperature sensing by exhibiting variable current flow in response to the temperature of the resister. In other embodiments, other forms of firing or block resisters may be employed and separate temperature sensors may alternatively be utilized. In yet other embodiments, other heating elements may be employed to heat or pre-warm print device 42 for enhanced printing performance.

Cover 43 comprises one or more members movably positioned with respect to print device 42. In particular, cover 43 comprises one or more members movable with respect to nozzles 60. Cover 43 is movable between a first position in which cover 43 extends opposite to an across nozzles 60 and a second retracted position in which nozzles 60 are exposed, permitting novel 62 eject printing material onto an opposite medium. In the particular bottom illustrated, cover 43 is moved by an actuator 67 which may comprise any of a variety of suitable members such as a voice coil, a solenoid, or motor driven device. According to one embodiment, cover 43 is actuated are moved from the covering position to the retracted position by actuator 67 in response to signals from controller 54 which are in turn in response to signals from sensor 48. As a result, print device 42 is ready for printing at the subsequent time that a printing command is received. In other moderates, this preconditioning activity of moving cover 43 may be omitted or may be performed at other times.

Indicator 44 comprises a component of capture and print unit 30 configured to communicate information regarding the status of unit 30. In one embodiment, indicator 44 is configured to communicate information to a person using visible or audible signals or displays. In another embodiment, indicator 44 may communicate such information to an external electronic device or control. In the particular embodiment illustrated, indicator 44 is configured to provide an indication of (1) when a prewarming signal has been generated (when the capturing of an image has been initiated and when warming up of device 42 has also been initiated) (2) when print device 42 has been sufficiently warmed for printing, and (3) when unit 30 is in sufficient proximity to a surface for printing. In other embodiments, indicator 44 may be configured to indicate fewer or other status circumstances. In one embodiment, indicator 44 may comprise a visible indicator such as one or more light emitting diodes, an audible indicator or combinations thereof. In yet other embodiments, indicator 44 may be omitted.

User interface 45 comprises an interface by which a person may enter commands instructing capture and print unit 30 to initiate printing with print device 42. For example, upon receiving an indication that print device 42 is that an appropriate temperature for printing from indicator 44, a person may actuate or otherwise enter a command via interface 45 to begin printing. In one embodiment, user interface 45 may comprise a pad, button, lever, switch, slide or other device by which a person may use his or her hands or fingers to enter a command. In another embodiment, user interface 45 may comprise a microphone with associated voice or speech recognition software. In yet other embodiments, user interface 45 may be omitted where other mechanisms are employed for initiating printing. For example, in one embodiment, printing may be initiated in response to signals received from print sensor 46 or in response to control signals received via external preconditioning signal interface 52 or communication interface 40.

Print sensor 46 comprises a sensing device or component associated with capture and print unit 30 that is configured to detect relative movement of capture and print unit 30, and in particular, print device 42, relative to a surface being printed upon, such as surface 24. Signals from print sensor 46 indicate the relative speed at which print device 42 is moving relative to the surface being printed upon. Signals from print sensor 46 are used by controller 54 to control the rate at which printing material is discharged from print device 42 and which particular nozzles 60 are being discharged to form an image, such as image 26. In the particular embodiment illustrated, print sensor 46 is further configured to indicate contact or sufficiently close proximity of print device 42 to surface 24 and the initiation of printing. In other embodiments, the initiation a printing may alternatively begin in response to actuation of a separate trigger, such as a button, switch and the like. According to one embodiment, print sensor 46 may comprise an encoder wheel and associated encoder, wherein the encoder wheel is either rotated along the surface being printed upon or moved laterally by pressure against the surface. In other embodiments, print sensor 46 may comprise a navigational sensor or other sensing device.

Sensor 48 comprises a component of capture and print unit 30 configured to sense an image separation distance between the surface having an image and sensor 48 or imager 38. According to one embodiment, sensor 48 detects the image separation distance without contacting surface 24. In one embodiment, sensor 48 comprises an ultrasonic circuit or sensor. One example of such an ultrasonic sensor is a 400ET080 Piezoelectric Sensor, commercially available from Pro-Wave Electronics Corp., 3$^{rd}$ Floor, No. 4, Lane 348, Section 2, Chung Shan Road, Chung Ho City, Taipei Hsien, Taiwan 235. In other embodiments, sensor 48 may comprise other ultrasonic sensors or may comprise other non-contact sensors such as infrared sensors. In still other embodiments, sensor 48 may comprise a sensor which contacts surface 24 when determining the image separation distance.

External preconditioning signal interface 52 comprises an electrical or optical interface by which capture and print unit 30 may receive preconditioning command signals (signals initiating warming or other preconditioning activities of printing device 48 prior to receipt of a print command) from an external control 76. For example, in one embodiment, external preconditioning signal interface 52 may comprise an electrical or optical port connected to an external control 76 via optical or electrical lines or cabling. External control 76 make comprise a separate processing unit configure to generate control signals which result in a preconditioning signal being generated, wherein the capture of an image and preconditioning of print device 42, such as warming up in device 42, are initiated in response to the preconditioning signal. In other embodiments, external preconditioning signal interface 52 may comprise a device configured to communicate wirelessly with an external control 76. In particular embodiments, external preconditioning signal interface 52 may be omitted, wherein such external preconditioning generation signals are received via communication interface 40. In yet other embodiments, external preconditioning signal interface 52 may be omitted.

Controller 54 comprises one or more processing units physically associated with capture and print unit 30 and configured to generate control signals directing operation of imager 38 and print device 42. For purposes of this application, the term "processing unit" shall mean a presently developed or future developed processing unit that executes sequences of instructions contained in a memory 55. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 54 may be embodied as part of one or more application-specific integrated circuits (ASICs). Unless otherwise specifically noted, the controller is not limited to any specific combination of hardware circuitry and software, nor to any particular source for the instructions executed by the processing unit.

In the particular embodiments illustrated, controller 54 is configured to operate in three different modes. In a first mode, controller 54 generates one or more preconditioning signals based upon data or information received from sensor 48. Based upon the detected or sensed image separation distance, sensor 48 generates and transmits a preconditioning signal, wherein the capture of an image by imager 38 and the preconditioning up of print device 42 is initiated in response to the preconditioning signal. For example, the preconditioning signal may initiate warming of the print device 42. Warming of print device 42 may be achieved using one or both of firing resister 62 or block resister 66. The preconditioning may also include initiation of sensor 46 or other sensors. The preconditioning may further include actuation of cover 43 to a retracted position.

In one particular embodiment, controller 54 generates and transmits the preconditioning signal when the sensed image separation distance is at an appropriate focal distance for imager 38. For example, controller 54 may generate a preconditioning signal when the image separation distance is less than a first predetermined threshold value and greater than a second predetermined threshold value. According to one embodiment, controller 54 transmits the preconditioning signal while print device 42 is spaced from surface 24 by too great of a distance for printing yet when imager 38 is appropriately spaced from surface 24 for sensing or capturing a visible image, such as image 22, upon surface 24.

Because controller 54 generates the preconditioning signal automatically in response to the image separation distance meeting predetermined threshold values or falling within a predetermined range of distances, the capturing of an image by capture and print unit 30 is enhanced without a person having to guess the appropriate image separation distance to begin image capture. At the same time, preconditioning, such as warming, of print device 42 is initiated earlier in time (prior to capture and print unit 30 being positioned for printing) and without a person having to initiate such preconditioning (such as pre-warming) or guess when such preconditioning should begin. As a result, sensor 48 of capture and print unit 30 enables print device 42 to be conditioned and ready for printing while reducing time that a person would wait for print device 42 to be readied.

In a second mode, controller 54 generates a preconditioning signal initiating the preconditioning of print device 42 in response to signals from sensor 48 representing a sensed proximity to surface 24 or another surface without initiating the capture of an image by imager 38. In a third mode, controller 54 generates the preconditioning signal initiating the capture of an image by imager 38 and/or the preconditioning (such as warming) of print device 42 in response to input received from an external control 76 via external preconditioning signal interface 52. In one embodiment, capture and print unit 30 is configured to permit the user to select one of the three modes by which controller 54 generates such preconditioning signals.

In another embodiment, capture and print unit 30 is configured to permit a user to program or enter a selection choosing more than one of the three modes. For example, in one embodiment, controller 54 may employ the first and third modes, wherein controller 54 generates one or more preconditioning signals initiating the capture an image and the preconditioning of print device 42 in response to the first input received (1) from external preconditioning signal interface 52 or (2) from sensor 48 where controller 54 determines that the image separation distance determined using signals from sensor 48 meets a predetermined threshold distance or falls within a predetermined range of distances. Regardless of which mode capture and print unit 30 operates under, the earlier initiation of preconditioning of print device 42 saves valuable time which would otherwise be consumed while waiting for print device 42 to be readied prior to printing. In the particular embodiment, the earlier initiation of the preconditioning (warming, sensor activation and cover actuation) of print device 42 while imager 38 captures an image, while the captured images transmitted to data source 32, while data source 32 analyzes the captured image and/or while data source 32 transmits print instructions based upon the captured image saves valuable time which would otherwise be consumed while waiting for print device 42 to warm or otherwise readied prior to printing Controller 54 further receives information or signals from print sensor 46 indicating capture and print unit 30 is sufficiently close to initiate printing. In response to signals from print sensor 46 indicating relative movement a capture and print unit 30 and surface 24 and based upon image data received from data source 32 via communication interface 40, controller 54 generates additional control signals causing firing resister 62 to eject printing material through nozzles 60 onto surface 24 to create an image, such as image 26, upon surface 24.

Figure 3:
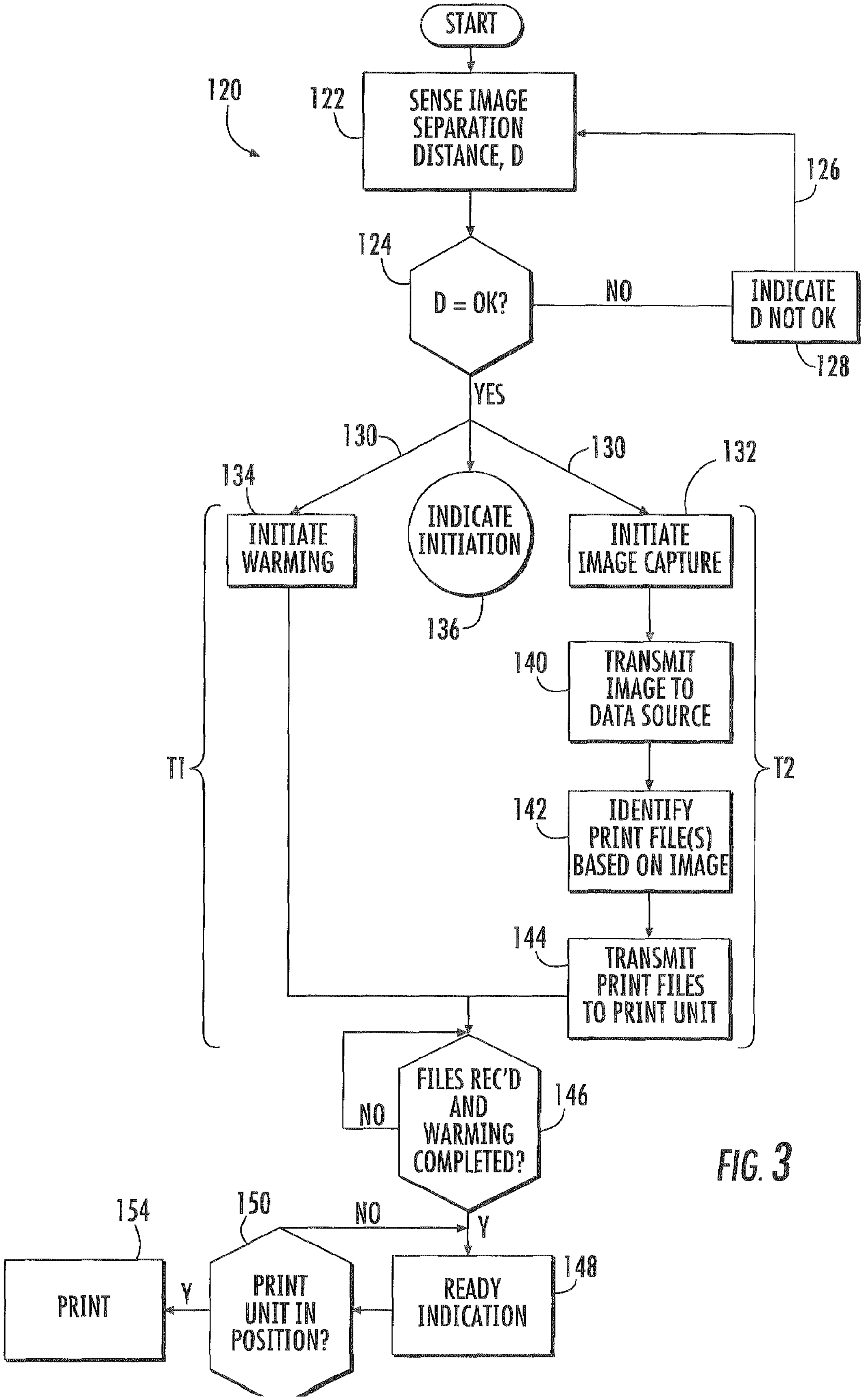
FIG. 3 is a flow diagram of a process for capturing a first image and printing a second image upon one or more surfaces according to an example embodiment.

FIG. 3 is a flow diagram illustrating one example method or process 120 by which printing system 20 may operate. As indicated by step 122, capture and print unit 30 senses image separation distance D. in particular, as shown in FIG. 1, capture and print unit 30 is positioned with respect to surface 24 containing an image 22 to be captured. As schematically represented by arrows 80, sensor 48 periodically or continually senses surface 24 containing image 22. As a result of such sensing, sensor 48 transmits signals to controller 54. Based upon such signals, controller 54 determines the image separation distance D separating capture and print unit 30 (or other portions thereof) and image 22.

As indicated by step 124, as capture and print unit 30 is moved towards or away from surface 24 (or as surface 24 is moved with respect to unit 30), controller 54 periodically or continually compares the determined image separation distance at each moment to a predetermined threshold or a predetermined range of distances. In one embodiment, such predetermined thresholds or ranges are based upon imager 38 and its focal range. For example, in one embodiment, the detected image separation distance D is compared to a desired image separation distance of between about 4 and about 9 inches for imager 38 which comprises a HandHeld Products integrated optical module and decoder (5×10 series Decoded Miniature Image Engine). In other embodiments, other threshold or ranges may be used depending upon imager 38 or other factors.

As indicated by the arrow 126, controller 54 continues receiving signals from sensor 48 and continues to compare the sensed image separation distance D with a predetermined threshold or range until the sensed image separation distance D meets a threshold or is within the predetermined range.

In one embodiment, as indicated by step 128 in FIG. 3, controller 54 generates control signals which cause indicator 44 to indicate to a person moving capture and print unit 30 or to an external control 76 (which may be operating a conveyor belt or other structure moving surface 24) that surface 24 and capture and print unit 30 are not spaced apart from one another by an image separation distance within the desired range or meeting the desired threshold. In one embodiment, this indication may be communicated to a person by indicator 44 emitting a certain colored light, for example, red light. In another embodiment, this indication may be made by selected lights being turned on or off or by words or graphics provided on a display. In yet other embodiments come this indication may be made audibly. In still other embodiments, step 128 may be omitted.

As indicated by arrows 130 in FIG. 3, upon the sensed image separation distance D meeting a selected threshold or falling within a predetermined range (either momentarily or for a predetermined minimum period of time), several actions are triggered. In particular, controller 54 (shown in FIG. 1) generates control signals which are transmitted to imager 38 causing imager 38 to initiate to capture or sensing of image 22 as schematically represented by arrow 82 in FIG. 1 and as indicated by step 132 in FIG. 3. According to one embodiment, imager 38 illuminates surface 24 and senses light reflected from image 22 with one or more charge coupled devices. In another embodiment, imager 38 irradiates surface 24 with infrared light or ultraviolet light to capture image 22.

At substantially the same moment or slightly before or after the same moment, as indicated by step 134 in FIG. 3, controller 54 generates control signals initiating warming of print device 42 (shown in FIG. 1). Such control signals are generated in response to the trigger provided by sensor 48 sensing an image separation distance which meets predetermined qualifications. In the particular embodiment illustrated, in response to such control signals, electrical energy is applied to block resister 66 (which may comprise more than one block resister) such that the entire print head is warmed until a predetermined temperature is attained. In another embodiment, in response to such control signals, electrical energy is applied to some or all of firing resister 62 such that firing resisters 62 heat up to warm the print head of print device 42. Such energy may be pulsed and controlled such that resisters 62 do not eject fluid through nozzles 60 during such warming. In yet another embodiment, both block resister 66 and firing resister 62 may be used to heat the one or more print heads of print device 42.

As indicated by step 136 in FIG. 3, upon the initiation of image capture and upon the initiation of warming (and upon the image separation distance the meeting the predetermined qualifications), controller 54 generates control signals causing indicator 44 to communicate to either the person manipulating capture and print unit 30 or an external control 76 that capture and print unit 30 and surface 24 are appropriately spaced from one another and that image capture has begun. Such communication would inherently also mean that warming print device 42 in preparation for printing is also begun. The indication provided in step 136 may be provided by indicator 44 emitting a selected color of light, such as a green light. In another embodiment, this indication may be made by selected lights being turned on or off or by words or graphics provided on a display. In yet other embodiments, this indication may be made audibly. In still other embodiments, step 136 may be omitted.

As indicated by step 140 shown in FIG. 3, the image captured by imager 38 is transmitted to data source 32. This transmission is schematically represented in FIG. 1 by arrow 84. In one embodiment, controller 54 generates control signals causing communication interface 40 to transmit the data to data source 32. In one embodiment, such communication may be performed wirelessly. In another embodiment, such communication may be performed via one or more physical electrical or optical connections such as with wires, cables or contact pads or pins.

As indicated by step 142 in FIG. 3, data source 32 analyzes such received image information or data to identify one or more print files based on the received image. For example, in one embodiment, data source 32 may analyze particular portions of the captured image and compare such portions to identify matches with a selected cross-reference, such as a look-up table, to identify corresponding images that should be printed by capture and print unit 30 upon surface 24. Based upon such comparisons, data source 32 prepares or selects stored print instructions which are included with the print files.

As indicated by step 144 in FIG. 3 and as schematically represented by arrow 86 in FIG. 1, data source 32 transmits the prepared or selected electronic print files to capture and print unit 30. In one embodiment, such print files are transmitted wirelessly to communication interface 40 which transfers such received instructions to controller 54. In other embodiments, such print files may be communicated in a wired fashion, electrically or optically. Controller 54 receives such print files and stores such print files in a buffer provided by memory 55 until print device 42 is ready for printing and until capture and print unit 30 is appropriately positioned with respect to surface 24 (or another surface) for printing image 26.

As indicated by step 146 in FIG. 3, controller 54 periodically or continually compares sensed or detected temperature of the one or more print heads of print device 42 with a predetermined threshold temperature to determine whether warming is completed and whether print device 42 has attained a desired temperature ready for printing. According to one embodiment, the desired temperature for the one or more printheads of print device 42 is at least about 35° C. At the same time, controller 54 also determines whether print files have been received from data source 32. In those circumstances where printing may have been recently performed, print device 42 (shown in FIG. 1) may have retained some heat from a previous printing operation such that warming of print device 42 may take less time then be carrying out of steps 132-144. In other circumstances where print device 42 has not been used for a prolonged period of time or where system 20 is being performed in a colder environment, warming of print device 42 may take a greater amount of time than the carrying out of steps 132-144.

As indicated by step 148 in FIG. 3, upon print device 42 attaining a desired temperature and upon receipt of the print files from data source 32, controller 54 generates control signals causing indicator 44 to communicate to a person manipulating capture and print unit 30 or to an external control 76 controlling capture and print unit 30 that print device and 42 is ready for printing. The indication provided in step 148 may be provided by indicator 44 emitting a selected color of light, such as a blue light. In another embodiment, this indication may be made by selected lights being turned on or off or by words or graphics provided on a display. In yet other embodiments, this indication may be made audibly. In still other embodiments, step 148 may be omitted.

As illustrated in FIG. 2, upon receiving a ready indication from indicator 44 (or another indicator) communicating that capture and print unit 30 is ready for printing, capture and print unit 30 is positioned into printing proximity with surface 24. In other embodiments, surface 24 may alternatively be moved towards capture and print unit 30. In the particular example illustrated, print sensor 46 senses or detects the relative positioning a capture and print unit 30 and surface 24. For example, in one embodiment in which print sensor 46 comprises an encoder wheel, depressing of the encoder wheel against surface 24 may be used to indicate appropriate printing proximity between capture and print unit 30 and surface 24. In another embodiment, initial rotation of the encoder wheel may indicate appropriate printing proximity. In still other embodiments, other sensing devices may be used to determine whether appropriate printing proximity exists. For example, in one embodiment, sensor 48 may additionally be used to determine the occurrence of appropriate printing proximity.

As indicated by step 150 in FIG. 3, controller 54 (shown in FIG. 2) periodically or continually compares signals from print sensor 46 (or another sensor) to a predetermined stored printing proximity value to determine whether capture and print unit 30 is in sufficient proximity to surface 24 for printing. If not, the ready indication as performed in step 148 is continued. In other embodiments, controller 54 may be configured to generate additional control signals causing indicator 44 to indicate that capture and print unit 30 is not in sufficient proximity to surface 24. If controller 54 determines that capture and print unit 30 is in sufficient proximity to surface 24 for printing, controller 54 generates control signals causing print device 42 to eject printing material onto surface 24 according to the print instructions received from data source 32 and as indicated by step 154 in FIG. 3. In the particular example illustrated, image 26 is printed upon surface 24 as illustrated in FIG. 2. In other embodiments, controller 54 may await a printing command received via user interface 45 prior to initiating printing with print device 42.

Because warming of print device 42 is concurrently performed while the capture of the image is performed, while the captured image 22 is transmitted to data source 32, while a corresponding print file based upon the captured images identified and/or while the identify print files are transmitted to capture and print unit 30, capture and print unit 30 is able to print the corresponding image based upon the received print files in a more timely manner. In particular, the time used to warm print device 42, T1, substantially completed overlaps the time used for the image capture and print file transmission activities of steps 132-144 which occurs during time T2. According to one embodiment, warming of print device 42 using block resister 66 generally takes up to 600 ms. At the same time, with an imager 38 comprising a HandHeld Products imager and communication interface comprising wireless 802.11g, capturing an image generally takes approximately 100 ms, transmitting such an image takes approximately 20 ms, identifying the print files based on image takes approximately 300 to 400 ms and subsequent retransmitting the print file takes approximately 20 ms. As a result, during the time it takes for image 22 to be captured, transmitted, analyzed and new printing instructions to be sent, warming of print device 42 is substantially completed. Consequently, by the time that capture and print unit 30 is positioned in sufficient proximity to surface 24, little additional delay occurs before printing may take place. In short, scanning and printing efficiency is enhanced.

In the particular example illustrated in FIGS. 1 and 2, image 22 comprises a product identification label such as a barcode, a Universal Product Code, a Maxi code or other form of codified or machine-readable product identification. Image 26 printed by capture and print unit 30 comprises a person-readable label including alphanumeric symbols and graphics. Examples of such a image 26 include a product name, a product price, inventory number, storage or display location or other information regarding the product to which is assigned the product identification in the form of image 22. In other embodiments, image 22 and image 26 may be reversed such that image 26 comprises a machine-readable identification tag while image 22 comprises a person-readable identification. In still other embodiments, one or both of images 22 and 26 may have other characteristics.

Figure 4:
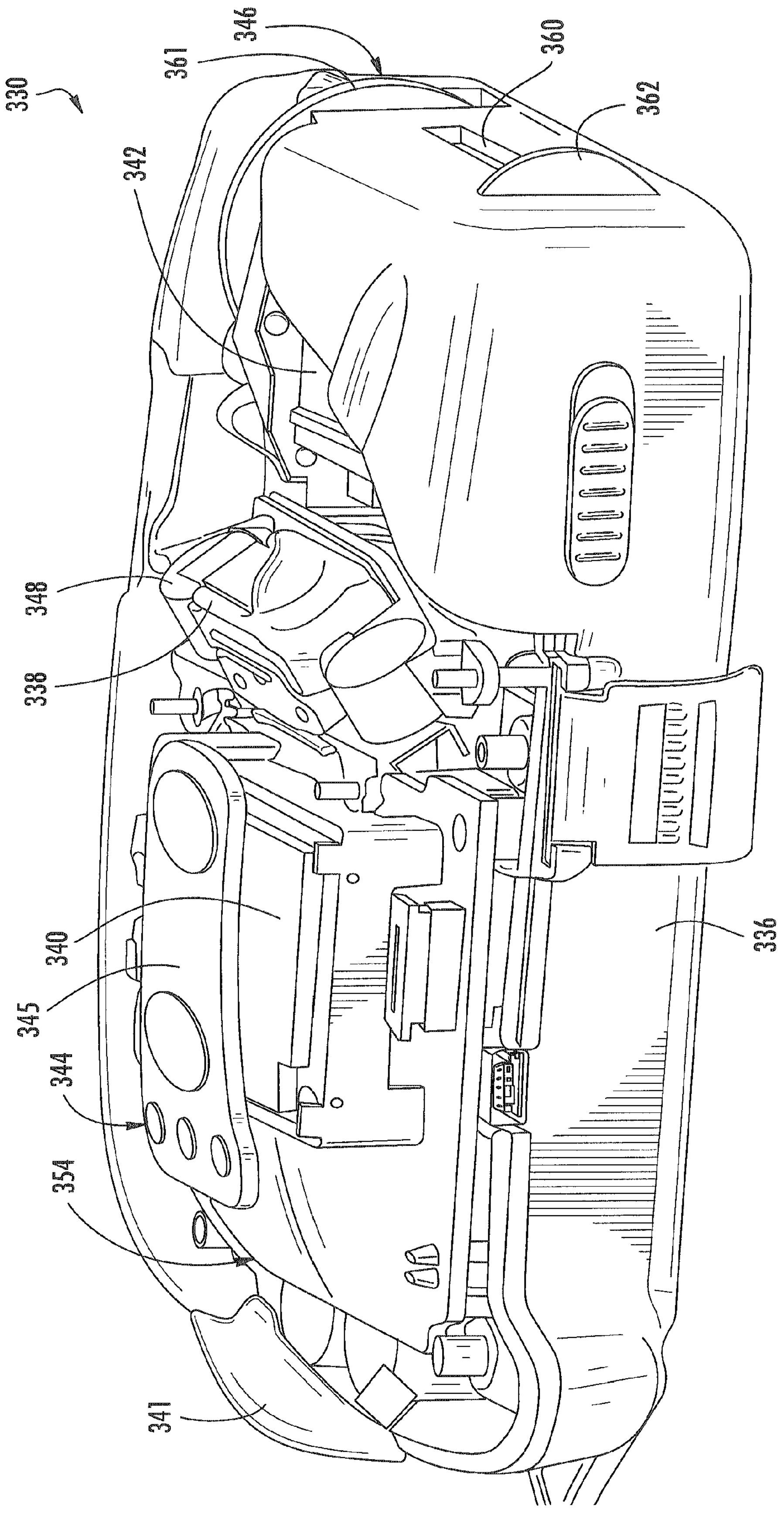
FIG. 4 is a fragmentary top perspective view of another embodiment of the capture and print unit of FIG. 2 according to an example embodiment.

FIG. 4 is a perspective view of capture and print unit 330, an alternative embodiment of capture and print unit 30 according to an example embodiment. For purposes of illustration, portions of capture and print unit 30 are broken away. As shown by FIG. 4, capture and print unit 330 includes body 336, imager 338, communication interface 340, print device 342, indicator 344, user interface 345, print sensor 346, sensor 348 and controller 354.

Body 336 comprises a structure or case configured to support the remaining components of capture and print unit 330. Body 336 at least partially encloses or houses such components. In one embodiment, body 336 is configured such that capture and print unit 330 is a hand held unit. As shown in FIG. 4, body 336 is a block, cylinder or similar structure configured to be grasped by a person's hand with the person's fingers wrapped about body 336. In the particular embodiment illustrated, body 336 is formed from a thermally conductive material such as a metal, such as magnesium, to enhance cooling of internal components of capture and print unit 336. In other embodiments, body 336 may be formed from other materials such as plastic materials or combinations of plastics, metals or other materials.

Imager 338 is configured to sense, scan or capture an image upon a surface. In one embodiment, imager 338 comprises a scanner module comprising a two dimensional (2D) charge coupled device (CCD) and one or more illumination sources such as targeted light emitting diodes, facilitating omni-directional scanning a in lowlight conditions. In other embodiments, imager 338 may comprise other devices configured to sense or capture the visible image such as other forms of a camera and the like. In yet other embodiments, imager 338 may utilize ultraviolet or infrared light to scan or sense an image on surface 24 (shown in FIG. 1). In one embodiment, imager 38 may be configured to read a code such as a Maxi code, barcode, Universal Product Code (UPC) and the like.

Communication interface 340 is configured to communicate with external electronic devices such as data source 32 (shown in FIG. 1). Communication interface 340 is configured to transmit data as well as to receive data. In one embodiment, communication interface 340 is configured to communicate wirelessly with external electronic devices. For example, in the particular embodiment illustrated, communication interface 340 is configured to communicate with radio waves and comprises wireless IEEE 802.11g module. In such an embodiment, the metallic housing of body 336 enhances cooling and dissipation of the heat generated by communication interface 340. In the particular embodiment illustrated, communication interface 340 has an antenna assembly which is contained or housed under a non-metallic cover or dome 341. In other embodiments, communication interface 340 may communicate with ultraviolet or infrared light. In still other embodiments, communication interface 340 may be a wired connection where communication occurs through electrical or optical cables. In other embodiments where data source 32 (shown in FIG. 1) is incorporated into capture and print unit 330 as part of controller 354 and its memory, communication interface 340 may be omitted.

Print device 342 comprises a device configured to eject or deposit printing material upon a surface, such as surface 24 (shown in FIG. 2). Print device 242 is configured such that printing performance of print device 242 is enhanced when print device 242 is warmed, such as to a temperature greater than room temperature. According to one embodiment, print device 342 is configured to deposit a fluid printing material or solution. When heated to an elevated temperature, the fluid printing material experiences enhanced fluid mechanics, whereby the fluid printing material more easily flows and fills ejection chambers and is more responsive to high frequency pulsing.

According to one embodiment, print device 342 comprises a thermal resistive drop-on-demand inkjet print head having nozzles 360 and firing resisters 62 (shown in FIG. 1) According one embodiment, print device 342 comprises a removable ink jet cartridge. Electrical energy applied to the firing resisters 62 heat up to a temperature sufficient to vaporize fluid within the corresponding fluid chambers (not shown), forcing drops of the fluid through corresponding nozzles 360. In addition to ejecting or firing fluid droplets, such firing resisters 62 may also be used to warm or pre-warm the print head of print device 342. In particular, pulses electrical energy may be provided to the firing resisters 62. Although the pulses of electrical energy are insufficient to heat such resisters 62 to a point so as to vaporize the fluid and eject the fluid droplets through nozzles 360, the pulses are sufficient to heat by resisters to temperatures so as to warm or heat the print head of print device 342.

Print device 342 further includes a block resister 66 (shown in FIG. 1). Block resister 66 comprises a generally larger resister as compared to the individual the firing resisters. Upon receiving electrical energy, block resister 66 heats up and discharges thermal energy has to heat a large portion or and entirety of the print head of print device 342. According to one embodiment, firing resisters as well as block resister 366 comprise temperature sensitive resistors (such as thermal sense resistors (TSR)) which serve dual purposes of providing resistive heat and facilitating temperature sensing by exhibiting variable current flow in response to the temperature of the resister. In other embodiments, other forms of firing or block resisters may be employed and separate temperature sensors may alternatively be utilized. In yet other embodiments, other heating elements may be employed to heat or pre-warm print device 342 for enhanced printing performance.

Indicator 344 comprises one or more devices configured to provide an indication of when print device 342 has been sufficiently warmed for printing. Indicator 344 further provides an indication of when image capture has been initiated and when capture and print unit 330 is in sufficiently close proximity to a surface for printing upon the surface. In the embodiment illustrated, indicator 344 comprises a plurality of light emitting diodes configured to emit different colors of light or configured to emit light which is filtered by different colored light filters, wherein the different colors of light indicate or communicate different information to a person using unit 330. In other embodiments, indicator 44 may have other configurations. For example, indicator 344 may additionally or alternatively be configured to provide distinct audible signals or sounds based on the state of capture and print unit 330. In yet other embodiments, indicator 344 may be omitted.

User interface 345 comprises an interface by which a person may enter commands instructing capture and print unit 330 to initiate printing with print device 342. For example, upon receiving an indication that print device 342 is that an appropriate temperature for printing from indicator 344, a person may actuate or otherwise enter a command via interface 345 to begin printing. In the example embodiment illustrated, user interface 345 comprises a pair of buttons, the depressed man of which actuates switches to create electoral signals which are transmitted to controller 354. In other embodiments, interface 345 may comprise a touch pad, lever, switch, slide or other device by which a person may use his or her hands or fingers to enter a command. In another embodiment, user interface 345 may comprise a microphone with associated voice or speech recognition software. In yet other embodiments, user interface 345 may be omitted where other mechanisms are employed for initiating printing. For example, in one embodiment, pretty may be initiated in response to signals received from print sensor 346.

Print sensor 346 comprises a sensing device configured to detect relative movement of capture and print unit 330, and in particular, print device 42, relative to a surface being printed upon. Signals from print sensor 346 indicate the relative speed at which print device 342 is moving relative to the surface being printed upon or vice versa. Signals from print sensor 346 are used by controller 354 to control the rate at which printing material is discharged from print device 342 and which particular nozzles 360 are being discharged to form an image. In the particular embodiment illustrated, print sensor 346 is further configured to indicate contact or sufficiently close proximity of print device 342 to the surface and the initiation of printing. In other embodiments, the initiation a printing may alternatively begin in response to actuation of a separate trigger such as to the use of interface 345.

In the example embodiment illustrated, print sensor 346 comprises an encoder wheel 361 and associated encoder (not shown), wherein the encoder wheel 361 is rotated a long the surface being printed upon. In the embodiment illustrated, unit 330 additionally includes an idler wheel 362 which is rotatably supported by body 336 on an opposite side of nozzles 360 as encoder wheel 361. Idler wheel 362 projects from body 336 a distance substantially equal to the distance at which encoder wheel 361 projects from body 336. Idler wheel 362 permits unit 330 to be rolled along a surface during printing while maintaining a level or parallel orientation with respect to the surface. In other embodiments, print sensor 346 may comprise a navigational sensor or other sensing device.

Sensor 348 comprises a device configured to sense an image separation distance between the surface having an image and sensor 348 or imager 338. Sensor 348 generates and transmits signals to controller 354, wherein controller 354 determines an image separation distance using such signals and generates a warming signal initiating the capture of an image by imager 338 and the warming up print device 342.

According to one embodiment, sensor 348 detects the image separation distance without contacting the surface being printed upon. In one embodiment, sensor 348 comprises an ultrasonic circuit or sensor. As shown by FIG. 4, in the embodiment illustrated, sensor 348 comprises a pair of ultrasonic ranging sensors located on either side of imager 338 for enhanced detection of image separation distance separating the surface to be scanned for an image and imager 338. In other embodiments, sensor 348 may comprise other ultrasonic sensors or may comprise other non-contact sensors such as infrared sensors. In still other embodiments, sensor 348 may comprise a sensor which contacts the surface being scanned or read when determining the image separation distance.

Controller 354 comprises one or more processing units physically associated with capture and print unit 330 and configured to generate control signals directing operation of imager 338 and print device 342. In the particular embodiments illustrated, controller 354 generates one or more warming signals based upon data or information received from sensor 48. In one particular embodiment, controller 354 generates and transmits the warming signal when the determined image separation distance, based upon signals from sensor 348, is at an appropriate focal distance for imager 338. For example, controller 354 may generate a warming signal upon the image separation distance being less than a predetermined threshold value and greater than a predetermined threshold value. According to one embodiment, controller 354 transmits the warming signal while print device 342 is spaced from the surface to be printed upon by too great of a distance for printing yet when imager 338 is appropriately spaced from a surface for sensing or capturing a visible image upon a surface. Such warming signals cause imager 338 to begin capturing of an image and cause print device 342 to be warmed via one or both of firing resister or block resister 66. Controller 354 further receives information or signals from print sensor 346 indicating capture and print unit 330 is sufficiently close to initiate printing. In response to signals from print sensor 346 indicating relative movement a capture and print unit 330 and a surface and based upon image data received from data source 32 (shown in FIG. 1) via communication interface 340, controller 354 generates additional control signals causing firing resisters 62 (shown in FIG. 1) to eject printing material through nozzles 360 onto the surface to create an image, such as image 26 (shown in FIG. 2), upon the surface.

Because controller 354 generates the warming signal automatically in response to the image separation distance meeting predetermined threshold values or falling within a predetermined range of distances, the capturing of an image by capture and print unit 330 is enhanced without a person having to guess the appropriate image separation distance to begin image capture. At the same time, warming of print device 342 is initiated earlier in time (prior to capture and print unit 330 being positioned for printing) and without a person having to initiate such pre-warming or guess when such pre-warming should begin. As a result, sensor 348 and controller 354 of capture and print unit 330 enable print device 342 to be warmed and ready for printing while reducing time that a person would wait for print device 342 to be readied.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:

a print device;

a sensor configured to detect proximity to a surface;

a controller configured to initiate preconditioning of the print device in response to the sensor's detecting the proximity and prior to the print device receiving a print command; and an imager configured to capture an image, wherein the controller is configured to generate control signals in response to the sensor's detecting the proximity and wherein the imager initiates capture of an image in response to the control signals.

2. The apparatus of claim 1, wherein preconditioning of the print device includes one or more preconditioning activities selected from a group of activities consisting of: initiating warming a print head, initiating an encoder, initiating a media sensor, initiating a safety sensor, or initiating movement of a cover relative to a print head.

3. The apparatus of claim 1, wherein the print device includes firing resistors and wherein preconditioning includes warming the print device using the firing resistors.

4. The apparatus of claim 1, wherein the print device includes a block resistor and wherein preconditioning includes warming the print device using the block resistor.

5. The apparatus of claim 1, wherein the sensor is configured to sense an image separation distance while out of contact with an image to be captured.

6. The apparatus of claim 1, wherein the sensor comprises an ultrasonic sensor.

7. The apparatus of claim 1 further comprising a housing enclosing the print device and a control interface configured to receive a preconditioning signal from a source external to the housing, wherein preconditioning of the print the print device is initiated in response to the preconditioning signal.

8. The apparatus of claim 1 further comprising a navigation sensor configured to detect relative movement of the print device and a surface to be printed upon.

9. The apparatus of claim 1, wherein the sensor is configured to sense a distance from the surface while out of contact with the surface.

10. The apparatus of claim 1 further comprising a communication interface configured to externally communicate images captured by the imager and to receive external print instructions.

11. The apparatus of claim 10, wherein the communication interface is wireless.

12. The apparatus of claim 1 further comprising a data source configured to receive images captured by the imager and to transmit print instructions based on the received images to the print device.

13. The apparatus of claim 1, wherein the controller is configured to initiate the preconditioning of the print device prior to receiving a print command.

14. The apparatus of claim 1, wherein preconditioning of the print device includes one or more preconditioning activities selected from a group of activities consisting of: initiating an encoder, initiating a media sensor, initiating a safety sensor, or initiating movement of a cover relative to a print head.

15. The apparatus of claim 1, wherein the controller is configured to initiate preconditioning while the print device is spaced from the surface by too great a distance for printing.

16. The apparatus of claim 1, wherein the controller is configured to generate control signals initiating printing based upon an analysis of the image that has been captured and wherein the controller is configured to initiate preconditioning at a time such that the print device undergoes preconditioning before or concurrently with the analysis.

17. The apparatus of claim 1, wherein the controller is configured to initiate preconditioning when an image separation distance between the print device and the image is at least 4 inches.

18. A method comprising:

preconditioning a print device prior to receiving a print command, wherein preconditioning of the print device includes one or more preconditioning activities selected from a group of activities consisting of: initiating warming a print head, initiating an encoder, initiating a media sensor, initiating a safety sensor, or initiating movement of a cover relative to a print head;

sensing a proximity to a surface, wherein preconditioning of the print device is initiated based on the sensed proximity; and printing with the print device in response to receiving the print command.

19. The method of claim 18 further comprising initiating capture of an image based upon the sensed proximity.

20. The method of claim 19 further comprising transmitting the captured image to a data source and receiving print instructions from the data source.

21. The method of claim 19, wherein the image is that of a product code and wherein a product label corresponding to the product code is printed.

22. The method of claim 18, wherein the print device undergoes preconditioning while the print device is spaced from the surface by too great a distance for printing.

23. A method comprising:

preconditioning a print device prior to receiving a print command;

printing with the print device in response to receiving the print command; and sensing a proximity to a surface, wherein preconditioning of the print device is initiated based on the sensed proximity.

24. The method of claim 23 further comprising initiating capture of an image based upon the sensed proximity.

* * * * *

UNITED STATES PATENT AND TRADEMARK OFFICE

CERTIFICATE OF CORRECTION

PATENT NO. : 8,194,254 B2
APPLICATION NO. : 11/669149
DATED : June 5, 2012
INVENTOR(S) : Gary G. Lutnesky et al.

It is certified that error appears in the above-identified patent and that said Letters Patent is hereby corrected as shown below:

In column 14, line 56, in Claim 7, after "print" delete "the print".

Signed and Sealed this
Fourth Day of December, 2012

David J. Kappos
*Director of the United States Patent and Trademark Office*